United States Patent [19]

Manchak, Jr. et al.

[11] Patent Number: 5,242,601
[45] Date of Patent: Sep. 7, 1993

[54] SLUDGE TREATMENT WITH CAO OR CAC$_2$ AND RECOVERY OF CAO THEREFROM

[75] Inventors: Frank Manchak, Jr.; Frank Manchak, III; Peter Manchak, all of Goleta, Calif.

[73] Assignee: Alternative Technologies For Waste, Inc., Santa Barbara, Calif.

[21] Appl. No.: 711,339

[22] Filed: Jun. 6, 1991

[51] Int. Cl.$^5$ ................ C02F 1/52; C02F 9/00
[52] U.S. Cl. ................ 210/711; 210/713; 210/737; 210/751; 210/766; 210/909
[58] Field of Search ............ 210/667, 711, 751, 909, 210/712, 713, 723, 724, 738, 766, 737

[56] References Cited

U.S. PATENT DOCUMENTS 3,623,975  11/1971  Cardinal et al. .......... 210/711
4,079,003  3/1978  Manchak .................. 210/747

Primary Examiner—Ivars Cintins
Attorney, Agent, or Firm—Roth & Goldman

[57] ABSTRACT

A process for treating contaminated sludges such as municipal sewage sludge, industrial waste sludge and riverbottom sludge with calcium oxide (CaO) and/or calcium carbide (CaC$_2$) with reclaiming and recycling of calcium oxide (CaO) from the reaction materials. The process is also applicable for dechlorinating PCB contaminated sludges.

25 Claims, 1 Drawing Sheet

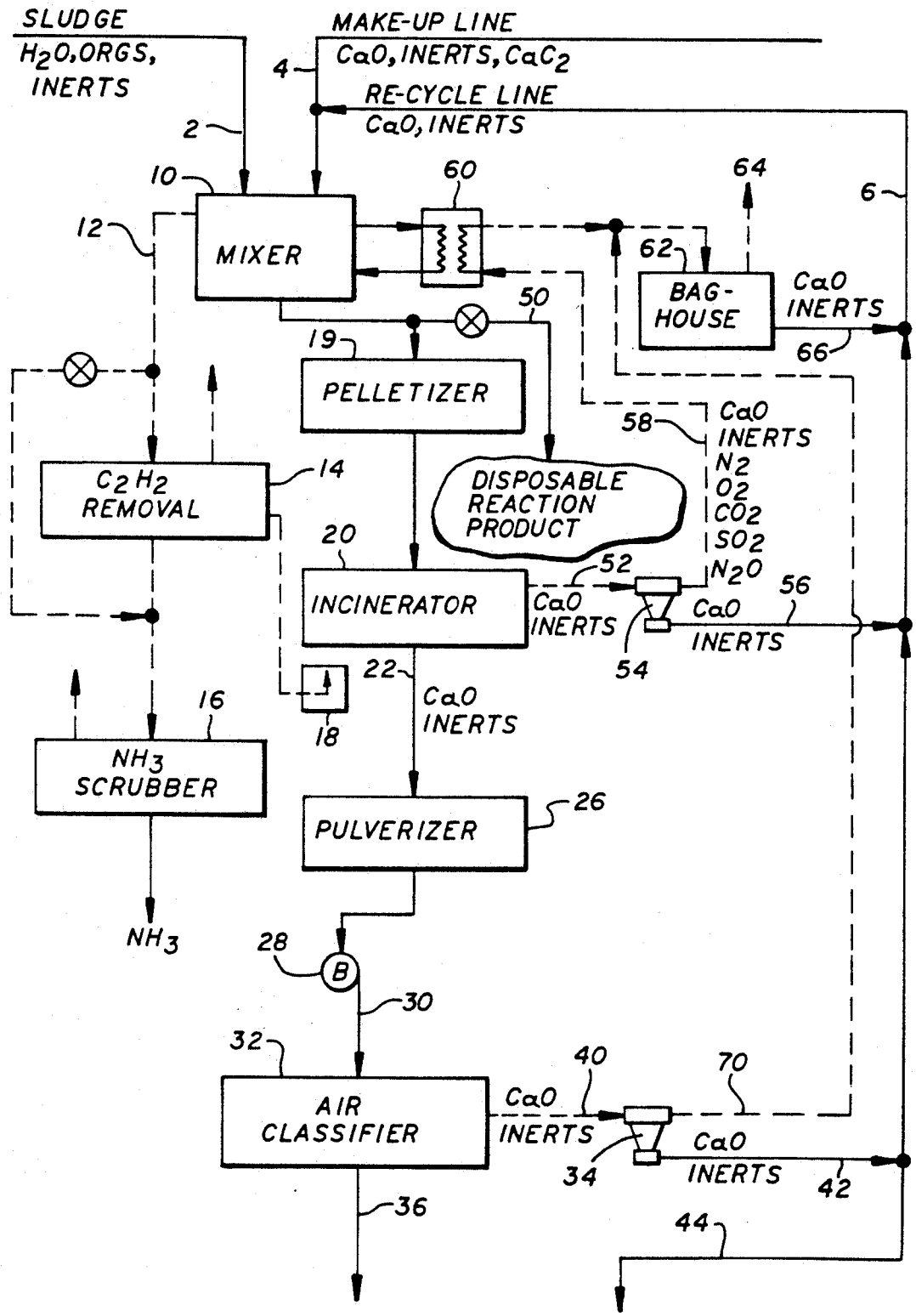

SLUDGE TREATMENT WITH CAO OR CAC₂ AND RECOVERY OF CAO THEREFROM

BACKGROUND OF THE INVENTION AND PRIOR ART

Calcium oxide (CaO) is commonly used in water softening and precipitation of hardness from water supplies and occasionally in waste water treatment. Less commonly, calcium oxide (CaO) is used for the treatment of sludges such as municipal sewage sludge, sea or river bottom sludge which may be contaminated with PCB's or industrial waste sludges.

Methods of transforming sludge into ecologically acceptable solid materials by using calcium oxide (CaO) are well known from, for example, U.S. Pat. No. 4,079,003 issued Mar. 14, 1978 to Frank Manchak, Jr. Briefly, that patent teaches mixing intimately mixing calcium oxide (CaO) with sludge having a water content of not over about 78% by weight in a confined space whereby an exothermic reaction takes place with consequent rise of temperature and pH which substantially deactivates bacteria and pathogenic organisms and results in a solid, friable and substantially odor free reaction product.

U.S. Pat. No. 4,270,279 issued Jun. 2, 1981 to Roediger teaches that intimate mixing of calcium oxide (CaO) and sludge need not take place so long as the exposed surfaces of dewatered sludge particles are dusted with calcium oxide (CaO) to form a granular product which can be used as fertilizer.

Although the reaction product resulting from the sludge treatment process disclosed in U.S. Pat. No. 4,079,003 is ecologically acceptable due to the specific conditions required in the process, substantial amounts of calcium oxide (CaO) are required with attendant expense. Also, any residual organisms present in the reaction product which are still active can result in odors and the need for further treatment such as incineration.

We have now discovered improved methods of treatment of sludge with calcium oxide (CaO) or, for the first time to our knowledge, with calcium carbide (CaC₂), wherein calcium oxide (CaO) can be reclaimed from the reaction product while the reaction product is exposed to a final incineration step so that a substantial portion of re-claimed calcium oxide (CaO) can be repeatedly recycled in the process. The resulting amount of reaction products to be disposed of is less than 10% of the weight of the wet sludge.

As defined herein, the term "sludge" is intended to encompass any and all types of sludge including, without limitation, municipal sewage sludge, riverbottom sludges, industrial waste sludges and contaminated soils such as found in hazardous waste disposal sites which may be contaminated with toxic metals, PCB's, etc. to which water may be purposely be added so as to give the contaminated soil a relative high moisture content so that the contaminated soil essentially attains the physical characteristics of common sludges.

The primary object of the invention is to economically and rapidly decompose sludge with simultaneous recovery and recycling of substantial portions of the treatment chemical used in the process.

SUMMARY OF THE INVENTION

The present invention accordingly provides a process of transforming sludge into a solid, friable, and substantially odor free reaction product comprising the steps of:

a. if necessary, reducing the water content of said sludge to not more than about 90% w of water;

b. intimately mixing from 20-30 parts by weight of a sludge treatment agent selected from the group consisting of calcium oxide (CaO) and a mixture of calcium carbide (CaC₂) and reclaimed calcium oxide (CaO) with 100 parts by weight of said aqueous sludge in an enclosed mixer to result in an exothermic reaction with the evolution of vapors and gases and which raises the temperature of the mixed sludge and treatment agent to at least 175° F. and precipitates heavy metals present therein;

c. agitating said mixed sludge and said treatment agent in said mixer while maintaining said temperature of at least 175° F. therein until the pH of the mixed sludge and treatment agent is at least 11 and to reduce pathogens present therein while withdrawing said vapors and gases therefrom until the moisture content is not in excess of about 5% to form a combustible solid, friable, substantially odor free reaction product of substantially reduced weight and volume;

d. feeding said reaction product from said mixer to an incinerator and therein incinerating the reaction product to thermally decompose Ca(OH)2 therein to calcium oxide (CaO) and to transform precipitated metals and organic material in said reaction product to inert ash;

e. pulverizing said calcium oxide (CaO) and inert ash;

f. separating heavy inert ash from an airborne stream of said pulverized calcium oxide (CaO) and ash;

g. recycling a major portion of pulverized calcium oxide (CaO) and inert ash recovered from said airborne stream to mix with said sludge; and h. moving said separated heavy inert ash to a disposal area.

BRIEF DESCRIPTION OF THE DRAWING

The drawing comprises a block flow diagram of the present invention.

DESCRIPTION OF THE PREFERRED EMBODIMENT

In the drawing, the flow of solids is indicated by solid lines while dashed lines and arrows indicate the path and direction of the flow of exhaust gases.

Wet sludge, such as sewage sludge, typically having a moisture content of about 85% to 90% by weight, is mixed and treated with a treatment agent comprised of calcium oxide (CaO) or a mixture of calcium carbide (CaC2) and reclaimed and recycled calcium oxide (CaO) in an enclosed mixer. Inert matter may also be, and usually is, present in the treatment agent in amounts which are not high enough to significantly lower the efficiency of the treatment agent. Wet sludge may ordinarily be introduced without prior conditioning through line 2 into the mixer, however if the sludge is particularly wet, its moisture content may first be reduced so as not to exceed about 90%. Calcium oxide (CaO) or calcium carbide (CaC₂) is introduced into the mixer via make-up line 4 and recycled calcium oxide (CaO) via recycle line 6.

Use of calcium oxide (CaO) as the treatment agent results in an exothermic reaction with the wet sludge in the mixer 10 which raises the temperature of the mixer contents from ambient to about 185° F. with the removal of most of the water content of the sludge as steam or chemically bound up in calcium hydroxide (Ca(OH)2) and with the formation of ammonia. If calcium carbide (CaC2) is used in the make-up line, acetylene is also formed in the mixer. The steam, ammonia and acetylene, if any, is continuously or intermittently removed from the mixer 10 via line 12 and transferred sequentially to an acetylene removal unit 14 and then to an ammonia scrubber 16 which separates ammonia and remaining steam from other gases generated in the mixer which are then passed to suitable filtration equipment (not shown) and released to the atmosphere.

The mixer 10 ordinarily receives a total of from about 20%-30% (not including inerts which may be present) by weight of calcium oxide (CaO) (including re-cycled calcium oxide) or calcium carbide (CaC2) mixed with re-cycled calcium oxide (CaO) based on the weight of the sludge. The major proportion of the required calcium oxide (CaO) is obtained by continuously recycling calcium oxide (CaO) reclaimed from previous use in the process which enters the mixer via line 6. The remaining required portion of calcium oxide (CaO) enters the mixer through make-up line 4.

The composition of treatment agent (calcium oxide (CaO) or calcium carbide (CaC2)) in the make-up line typically consists of about 85% treatment agent and 15% inerts whereas the composition of the recycle line is ordinarily of the order of 70%-80% calcium oxide (CaO) and 20%-30% inerts.

When calcium carbide (CaC2) is chosen in the make-up line 6 as part of the sludge treatment chemical agent, mixing of wet sludge with calcium carbide (CaC2) results in an appreciably exothermic reaction which generates more heat than the exothermic reaction produced when calcium oxide (CaO) is mixed with wet sludge. Explosive conditions can easily be reached in the mixer 10 unless care is taken to ensure adequate cooling. This can be done in a variety of ways including careful control of the rates at which wet sludge and calcium carbide (CaC2) and recycled materials are added to the mixer 10 and/or placement of a water cooling jacket on the mixer 10. Various types of well known mixers in which acetylene is generated by the reaction of calcium carbide (CaC2) and water are well known which essentially control the reaction rate so that the heat can be dissipated. The reaction also results in the formation of calcium hydroxide (Ca(OH)2). The acetylene is released in gaseous form from the mixer 10 and removed therefrom via line 12 to the acetylene recovery unit 14. Although the acetylene recovered from the mixer 10 may be too contaminated with other volatiles from the sludge for commercial resale, it nevertheless is a convenient source of fuel which may be burned to heat the incinerator 20 described below or the acetylene can be burned off to atmosphere at burner 18 with other volatile contaminants.

When calcium carbide (CaC2) is used in the make-up line 4, the temperature reached in the mixer may also be conveniently controlled by selecting the relative proportions of calcium carbide (CaC2) from the make-up line 4 and calcium oxide (CaO) from the recycle line 6 which are introduced to the mixer 10. The larger the proportion of calcium carbide (CaC2), the higher the resulting temperature in the mixer 10. The mixer temperature ideally should be maintained in the range of from about 185° F. to a maximum of about 350° F. to prevent or minimize steam distillation of organic matter present in the sludge. The mixer 10 is preferably a continuous flow mixer sized so as to provide a residence time adequate to allow the exothermic reaction to raise the temperature of the mixer contents to about 250° F. and a pH of not less than 11 and preferably 12 or above so that the combined chemical and physical action in the mixer 10 substantially completely precipitates the heavy metals and deactivates living organisms present in the sludge and dechlorinates any PCB's present therein. A residence time of from as little as 15 minutes to as much as 2 hours is typical.

The mixer 10 is enclosed to prevent the escape (other than via line 12) of noxious gases generated during the reaction of sludge with calcium oxide (CaO) or calcium carbide (CaC2). Regardless of whether calcium oxide (CaO) or calcium carbide (CaC2) is used in the make-up line 4, the solids output of the mixer 10 is comprised principally of calcium hydroxide (Ca(OH)2), inert materials (mostly sand and grit in municipal sewage sludge and possibly also some heavy metals) and a negligible proportion of water.

The now substantially water free mixer solids output comprised primarily of calcium hydroxide (Ca(OH)2) and inerts is then directed to an incinerator 20. Optionally, this product, which is mostly in particulate form of size depending upon the type of mixer employed, may be immediately pelletized in a pelletizer 19 without being allowed to cool before introducing it into the incinerator 20 to improve the burning therein. The incinerator 20 is preferably a rotary calcining kiln, where the product is further heated to reconvert the calcium hydroxide (Ca(OH)2) therein to calcium oxide (CaO) which is subsequently reclaimed and recycled in the process. A continuous flow first in/first out kiln is preferred in which the calcining temperature and residence time are selected, based on particle size, porosity and density of the materials to be incinerated, adequate to result in substantially complete calcining of the calcium hydroxide (Ca(OH)2) in the mixer solids output. It is known that the temperature is more important than the calcining time although typically the temperature can range from 900° C. to 1400° C. for about 2½ to 5 hours depending upon the physical characteristics of the material to be incinerated.

When calcium oxide (CaO) is chosen as the treatment agent, the incinerator solids output in line 22 will typically comprise 70%-80% calcium oxide (CaO) and 20%-30% inerts. The incinerator solids output is pulverized to particle size in pulverizer 26 and passed by blower 28 in an airborne stream 30 to an air classifier 32 followed, optionally, by a cyclone 34, which essentially removes heavy inerts via line 36 as bottoms from the calcium oxide (CaO) and lighter inerts which are passed via lines 40 and 42 to the recycle line 6 to be reintroduced to the mixer 10 as needed. A significant portion of calcium oxide (CaO) and inerts from the air classifier 32 is unnecessary for recycling and thus can be rejected at reject line 44 for further treatment or reclaiming for use elsewhere.

The mixer solids product, principally comprising calcium hydroxide (Ca(OH)2) and inerts with a minimal amount of water, is, if desired, removed via product line 50 rather than passed to the incinerator 20 since it is a commercially saleable substantially treated product which has been treated in mixer 10 long enough to have a pH of about 12 or above so that it contains no active bacteria or pathogenic organisms. This product is quite useful for sealing solid waste landfills since vermin ordinarily attracted to solid waste dumps are deterred by the high pH of the mixer solids product.

While the mixer solids product can be allowed to cool upon removal from the mixer if it is not removed via line 50 to be sold, it is preferably passed directly to the incinerator 20 at a temperature of about 250° upon exit from the mixer 10 to minimize the amount of fuel which would otherwise be necessary to heat the incinerator 20 to its ideal operating temperature. Heat may be conserved in the process by removing incinerator gases, containing incinerated organic components as well as some particulate calcium oxide (CaO) or calcium carbide (CaC2) and inerts, and passing the gases via line 52 to a cyclone 54 which removes most of the particulate matter from the gaseous stream in line 52 as incyclone bottoms which are then transferred via line 56 to the recycle line 6. The hot cleansed incinerator gas discharged in line 58 from cyclone 54 may optionally be heat exchanged in a heat exchanger 60 with the mixer 10 so as to add additional heat to the mixer 10 if necessary thus minimizing external fuel consumption which might otherwise be required. It will be appreciated that the mixer contents should reach a temperature of not less than 250° F. thus heat recycle or other heating of the mixer 10 may necessary unless significant amounts of calcium carbide (CaC2) are used in the make-up line 4 to the mixer whereby the higher temperatures generated by the calcium carbide (CaC2)/water reaction can enable the mixer contents to reach 250° F. without additional heating of the mixer 10. Present economics indicate that it is less expensive to use calcium oxide (CaO) in the make up line 4 combined with heat recycling at exchanger 60 or to simply electrically heat the mixer rather than use the more expensive calcium carbide (CaC2) in the make up line 4 with or without heat recycling.

The cooled incinerator gases in line 58 following heat exchange, are finally cleaned in a baghouse 62 before discharge to atmosphere at 64. Any remaining calcium oxide (CaO) or calcium carbide (CaC2) and inerts removed in the baghouse 62 from is then passed via line 66 to the recycle line 6 for continued use in the process.

The various pieces of equipment used in the process are conventional and commercially available. For example, one suitable form of mixer is a continuous Mix-mill unit manufactured by Processall, Inc. of Cincinnati, Ohio which utilizes a mechanically fluidized bed mixing action for mixing solids with solids or liquids on a continuous basis. The retention time in the mixer 10 should be long enough so that the exothermic reaction which takes place therein thoroughly heats the materials and raises the pH to a minimum of 11 and ordinarily 12 or above thus resulting in removal of most of the water content of the sludge as steam or in calcium hydroxide (Ca(OH)2) and destruction or disablement of bacteria and pathogenic organisms present in the sludge so that the mixer solids output is biologically inactive and suitable for commercial sale whenever desired.

The mixer 10 can also be equipped with ultrasonic mixing equipment in addition to or in place of the usual mechanical stirring apparatus which fluidizes and agitates the mixer contents. This is particularly desirable when treating sludges known to contain PCB's which must be dechlorinated. Ultrasonic mixing enhancement of the mixer results in cavitation, formation and the implosion of microbubbles in the mixer contents with resultant propagation of shock waves and violent physical disruption of the mixer contents. It is believed that this severe physical disruption of the sludge alone results in death or disablement of living pathogens in the sludge. Such physical disruption in combination with high temperatures and high pH in any event is quite effective in dechlorination of PCB's and essentially results in an environmentally safe and disposable mixer solids output product.

The incinerator 20 will ordinarily operate at a temperature of 1200° F. or above to convert calcium hydroxide (Ca(OH)2)s present in the mixer solids output product to calcium oxide (CaO) which may be reclaimed or re-cycled. The incinerator 20 is preferably a rotary kiln incinerator which adequately converts substantially all of the calcium hydroxide (Ca(OH)2) in the mixer solids output to calcium oxide (CaO) and incinerated sludge organics.

The incinerator solids output passed via line 22 to pulverizer 26 comprises ash consisting essentially of reclaimable calcium oxide (CaO) and inerts which is pulverized to particle size to facilitate separation and removal of heavy inerts (such as sand and heavy toxic metals) from the calcium oxide (CaO) by the air classifier 32 and cyclone 34. The pulverizer preferably reduces the calcium oxide (CaO) and inert materials in the incinerator output to $-60$ mesh. The heavy ash and inerts (such as sand and heavy toxic metals) gravitationally removed as bottoms by the classifier 36 is discharged to a toxic waste storage area from which it may be periodically removed for disposal elsewhere. The top gases from the cyclone 34, if used, containing negligible amounts of calcium oxide (CaO) and the remaining airborne lightest inerts, is passed to the baghouse 62 via line 70.

Ideally, calcium oxide (CaO) is completely separated from the incinerated sludge inerts (sand, grit, toxic heavy metals, etc.) in the pulverized incinerated product. However, total separation is considered economically impractical. It has been found that as much as 25% of inerts in the recycled calcium oxide (CaO) in line 6 is not harmful to the process provided that the concentration of inerts in the make-up line 4 is relatively low (below about 20%) so that the total concentration of inerts in the combined recycled and make-up materials does not exceed about 25%.

Continued recycling of calcium oxide (CaO) and entrained inerts not removed in the process eventually results in a buildup of the proportion of inerts present in the recycle line 6. When this situation occurs, a portion of the recycled stream is discarded at 44 and replaced via the make-up line 4 with fresh calcium oxide (CaO) or fresh calcium carbide (CaC2).

In the incinerator 20, the now harmless sludge organics are burned (with or without the addition of auxiliary fuel) to produce hot exhaust gases and to convert calcium hydroxide (Ca(OH)2) present in the mixture back into calcium oxide (CaO) by the absorption of energy and the release of water.

Hot exhaust gases produced in the incinerator 20 and removed therefrom via line 52, include dust, various inorganic gaseous compounds and elements and possibly unburned hydrocarbons created by thermal degradation of the sludge organics or oils in the burning mixture. Unburned hydrocarbons may be present if the incinerator exit gas temperature is below 1400° F. as is ordinarily the case. The hot gases exiting the incinerator 20 are first cleaned in cyclone 54 to remove as much dust as possible, then proceed via line 58 to the heat exchanger 60 and finally to the baghouse 62 for removal of any remaining particulate calcium oxide (CaO) (or calcium carbide (CaC2)) and remaining light inerts before discharge of the relatively clean gases to atmosphere. The incinerator gases in line 58 are likely to contain small but possibly significant amounts of sulfur or other compounds in which instance additional removal equipment, not part of the present invention may be required.

Although a baghouse has been disclosed for final clean-up of the incinerator gases, any particular removal device that is compatible with the system is satisfactory, e.g. an electrostatic precipitator, Venturi scrubber, media bed filters, computer-designed micro cyclones, etc. Essentially, the baghouse or equivalent removes sufficient particulate from the exhaust gas stream to satisfy air pollution control regulations.

A portion of calcium oxide (CaO) in the mixer 10 may be transformed to calcium carbonate (CaCO3) due to the presence of carbon dioxide in the sludge. The incinerator 20 will normally not operate at a temperature substantially greater than the minimum necessary to thermally decompose calcium hydroxide (Ca(OH)2) to calcium oxide (CaO) (1112° F.) and any calcium carbonate present in the reaction product will simply remain an inert loading in the recycled treatment agent in line 6. The plant design preferably allows for the burning of primary fuel in the incinerator 20 to raise the temperature to that necessary for conversion of calcium carbonate to calcium oxide (CaO) plus carbon dioxide (2200° F.). The temperature of the incinerator 20 should be occaionally elevated, e.g., for one or two days a week, so that all of the calcium carbonate that is recycled can be occasionally re-transformed to calcium oxide (CaO).

The process parameters are expressed in pounds per hour and degrees fahrenheit according to which it can be seen, in the specific example, that the total amount of calcium oxide (CaO) mixed with wet sludge in the mixer 10 comprises about 22.5% of the weight of the sludge. The moisture content of the wet sludge is 87.9%; the proportion of inerts in the make-up line is about 15%; the proportion of inerts in the recycle stream is about 26% and the make-up stream comprises about 12% of the recycle stream. All percentages are based on relative weights.

The exothermic reaction in the mixer 10 can ordinarily be expected to raise the temperature of the materials from an ambient temperature of about 50° F. to about 187° F. Ideally, the product exiting the mixer should be at a temperature of 250° F. before entry into the incinerator. Accordingly, the mixer is heated as necessary to insure that the product temperature, upon exit therefrom is 250° F. or greater. This heating can be accomplished in a variety of ways including heat exchange with recycled incinerator gases, externally heating the mixer, heating the sludge and/or chemical treatment agent before introducing it into the mixer, and using heat generated by ultrasonic vibration of the mixer contents.

A heat and materials balance has not been calculated for the use of calcium carbide (CaC2) instead of calcium oxide (CaO) in the make up line; however, the results are expected to be substantially the same with the exception that calcium carbide (CaC2) will generate higher temperatures in the mixer so that heat recycling from the incinerator is less likely to be necessary.

When sludges known to be contaminated with PCB's (polychlorinated biphenyls) are encountered, a particularly effective treatment thereof to dechlorinate the PCB's involves the intimate mixing of such sludges with calcium carbide (CaC2) without any re-claimed and re-cycled calcium oxide. Bentonite may also be added to the mixture as a catalyst which provided nucleation sites for the treatment of PCB's. The substantially higher exothermic reaction temperatures developed when a high concentration of calcium carbide is used as the treatment agent are more effective in PCB dechlorination than use of lower temperatures resulting from lower concentrations of calcium carbide which result when calcium oxide is re-claimed from and re-circulated in the process. Enhanced intimate mixing when PCB's are present in the sludge by the use of ultrasonic mixing equipment is also believed to comprise a very effective means of treatment, particularly when calcium carbide is used as the treatment chemical.

Persons skilled in the art will readily appreciate that various modifications can be made from the preferred embodiment thus the scope of protection is intended to be defined only by the limitations of the appended claims.

We claim:

1. A process of transforming sludge into a solid, friable, and substantially odor free reaction product comprising the steps of:
   a. if necessary, reducing the water content of said sludge to not more than about 90% w of water;
   b. intimately mixing from 20–30 parts by weight of a sludge treatment agent selected from the group consisting of (1) a mixture of calcium carbide (CaC2) and reclaimed calcium oxide (CaO); and (2) a mixture of makeup calcium oxide (CaO), calcium carbide (CaC$_2$) and reclaimed calcium oxide (CaO) with 100 parts by weight of said aqueous sludge in an enclosed mixer to result in an exothermic reaction with the evolution of vapors and gases and which raises the temperature of the mixed sludge and treatment agent to at least 250° F. and precipitates heavy metals present therein, said temperature resulting from the exothermic reaction of sludge and treatment agent comprised at least in part of calcium carbide (CaC$_2$);
   c. agitating said mixed sludge and said treatment agent in said mixer while maintaining said temperature of at least 250° F. therein until the pH of the mixed sludge and treatment agent is at least 11 and to reduce pathogens present therein while withdrawing said vapors and gases therefrom until the moisture content is not in excess of about 5% to form a combustible solid, friable, substantially odor free reaction product of substantially reduced weight and volume;
   d. feeding said reaction product from said mixer to an incinerator and therein incinerating the reaction product to thermally decompose Ca(OH)2 therein to calcium oxide (CaO) and to transform precipitated metals and organic material in said reaction product to inert ash;
   e. pulverizing said calcium oxide (CaO) and inert ash;
   f. separating heavy inert ash from an airborne stream of said pulverized calcium oxide (CaO) and ash;
   g. recycling a major portion of pulverized calcium oxide (CaO) and inert ash recovered from said airborne stream to mix with said sludge; and
   h. moving said separated heavy inert ash to a disposal area.

2. The process of claim 1, comprising the further step of pelletizing said mixer reaction product before discharging it at a temperature of not less than 250° F. to said incinerator.

3. The process of claim 1, wherein said treatment agent is mixed calcium carbide ($CaC_2$) and calcium oxide (CaO) and the reaction with wet sludge results in the formation of acetylene in the mixer, further comprising the steps of removing said acetylene from the mixer and burning said acetylene.

4. The process of claim 3, comprising the step of burning said acetylene as an auxiliary heat supply for said incinerator.

5. The process of claim 1, wherein the temperature in said mixer is maintained low enough during said mixing and agitation to prevent steam distillation of organic matter present in the sludge.

6. The process of claim 1, wherein said reaction product is incinerated at a temperature sufficiently high to convert $Ca(OH)_2$ to CaO and $H_2O$.

7. The process of claim 6, wherein said temperature is not less than about 1200° F.

8. The process of claim 6, wherein the temperature of said incinerator is periodically raised to a temperature of at least about 2200° F. to convert $CaCO_3$ present in the reaction product to CaO.

9. The process of claim 6, wherein said recycled portion is mixed with said sludge in said mixer.

10. The process of claim 6, wherein said recycled portion is mixed with fresh treatment agent before mixing with sludge in said mixer.

11. The process of claim 6, wherein the calcium oxide (CaO) in said recycled portion comprises from 85% to 95% of the treatment agent mixed with said sludge.

12. The process of claim 6, comprising the step of removing hot gases from said incinerator and wherein at least a part of said recycled portion is separated from hot gases removed from said incinerator.

13. The process of claim 12, wherein heat available from said separated hot incinerator gases in used to heat said mixer.

14. The process of claim 13, including the step of separating heavy inerts and a major portion of calcium oxide (CaO) present in said incinerator gases therefrom before using said hot incinerator gases to heat said mixer.

15. The process of claim 14, wherein said major portion is not less than 75%.

16. The process of claim 1, wherein said sludge and said treatment agent are ultrasonically mixed together.

17. The process of claim 1, wherein said sludge and said treatment agent are agitated in said mixer until the pH of the mixer contents is at least 12.

18. A process of transforming PCB containing sludge into a solid, friable, and substantially odor free reaction product comprising the steps of:
 a. if necessary, reducing the water content of said sludge to not more than about 90% w of water;
 b. intimately mixing from 10–20 parts by weight of calcium carbide ($CaC_2$) with 100 parts by weight of said aqueous sludge in an enclosed mixer to result in an exothermic reaction with the evolution of vapors and gases and which raises the temperature of the mixed sludge and treatment agent to at least 300° F. and dechlorinates PCB's and precipitates heavy metals present therein; and
 c. agitating said mixed sludge and said treatment agent in said mixer while maintaining said temperature of at least 300° F. therein until the pH of the mixed sludge and treatment agent is at least 11 while withdrawing said vapors and gases therefrom until the moisture content is not in excess of about 5% to form a combustible solid, friable, substantially odor free reaction product of substantially reduced weight and volume.

19. The process of claim 18, including the step of mixing an effective amount of bentonite particles with said sludge to provide nucleation sites for the dechlorination of said PCB's in said mixer.

20. A process of transforming PCB containing hazardous waste into a solid, friable, and substantially odor free reaction product comprising the steps of:
 a. if necessary, reducing the water content of said waste to not more than about 90% w of water;
 b. intimately mixing from 20–30 parts by weight of a treatment agent selected from the group consisting of (1) calcium carbide ($CaC_2$) and (2) a mixture of calcium carbide ($CaC_2$) and calcium oxide (CaO) with 100 parts by weight of said waste in an enclosed mixer to result in an exothermic reaction with the evolution of acetylene, vapors and gases and which raises the temperature of the mixed waste and treatment agent to at least 250° F. and precipitates heavy metals present therein;
 c. agitating said mixed waste and said treatment agent in said mixer while maintaining said temperature of at least 250° F. therein until the pH of the mixed waste and treatment agent is at least 11 while withdrawing said acetylene, vapors and gases therefrom until the moisture content is not in excess of about 5% to form a combustible solid, friable, substantially odor free reaction product of substantially reduced weight and volume;
 d. feeding said reaction product from said mixer to an incinerator while removing said acetylene from the mixer and burning said acetylene as an auxiliary heat supply for said incinerator and incinerating the reaction product in said incinerator to thermally decompose $Ca(OH)_2$ therein to calcium oxide (CaO) and to transform precipitated metals and organic material in said reaction product to inert ash; and
 e. separating said ash from said pulverized calcium oxide (CaO).

21. The process of claim 20, comprising the further step of pelletizing said mixer reaction product before discharging it to said incinerator.

22. The process of claim 20, wherein said treatment agent is mixed calcium carbide ($CaC_2$) and calcium oxide (CaO).

23. The process of claim 20, wherein heat available from said separated hot incinerator gases in used to heat said mixer.

24. The process of claim 23, including the step of separating heavy inerts and a major portion of calcium oxide (CaO) present in said incinerator gases therefrom before using said hot incinerator gases to heat said mixer.

25. The process of claim 24, wherein said major portion is not less than 75%.

* * * * *